United States Patent

Grimaldi et al.

Patent Number: 5,845,969
Date of Patent: Dec. 8, 1998

[54] ROLLING BEACH LOUNGE CHAIR

[76] Inventors: Camille M. Grimaldi, 175 Zoe St., Apt 6B, Staton Island, N.Y. 10305; Janice Moschetta, 318 Knight Ct.; Barbara Wagner, 287 Bishop Ct., both of Old Bridge, N.J. 08857

[21] Appl. No.: 901,496

[22] Filed: Jul. 28, 1997

[51] Int. Cl.[6] .......................................... A47C 1/12
[52] U.S. Cl. ...................... 297/445.1; 297/452.3
[58] Field of Search ................ 297/35, 39, 16.1, 297/463.2, 452.3, 452.21, 452.2, 452.19, 452.18, 445.1, 446.2, 447.1, 447.2; 280/205, 78

[56] References Cited

U.S. PATENT DOCUMENTS 2,906,319  9/1959  Goldstein .
3,290,089  12/1966  Farrell .
5,570,926  11/1996  Papiernik et al. .

FOREIGN PATENT DOCUMENTS 163437  12/1985  European Pat. Off. .
90/07889  7/1990  WIPO .

*Primary Examiner*—Milton Nelson, Jr.

[57] ABSTRACT

A rolling beach chair is provided which is electrically insulated and that is quiet when rolled on a hard surface. The frame of the beach chair is curved to fit the curves of the human body so that the weight is evenly distributed over the whole body surface. Thus, edema due to excessive pressure on small body surface areas is eliminated. The open, hollow construction of both the frame and the rollers allows water to enter and exit easily. In this way the chair remains stable and does not float away with wave action.

2 Claims, 2 Drawing Sheets

ROLLING BEACH LOUNGE CHAIR

BACKGROUND OF THE INVENTION

This invention relates to rolling beach lounge chairs that are adapted to roll on beach sand.

Graham in U.S. Pat. No. 5,362,079 discloses a beach caddy that is a triangular trailer to which a beach chair may be attached to transport articles on the beach. The wheels are not part of the chair, but are attached to the trailer that can carry a chair. Since there are two wheels on either end, the caddy does not support much weight on loose beach sand, sinks into the sand and does not roll well.

Dominko in U.S. Pat. No. 4,376,547 and Spurrier et al. in U.S. Pat. No. 5,423,592 both disclose a lounge chair with two separated wheels. However, when loaded with the full weight of a person, these wheels will sink into loose sand deeply enough to comtaminate the bearings. These wheels will not roll easily in loose beach sand when fully loaded with the full weight of a substantial adult.

Goad, Sr. in U.S. Pat. No. 5,403,220 discloses a jet-propelled floating chair that is supported by elongated floats and a buoyant roller that allows the chair to roll on dry land. The roller is specified to be made of foam plastic which is buoyant and which serves to roll the assembly over dry land. However, the foam roller will only support an empty chair on dry land. This foam roller is not a coating over a strong material and would be damaged and destroyed under the weight of a substantial adult seated in the chair and the foam would disintegrate upon rolling the chair with an adult human seated therein. Therefore, the chair is not designed for loaded use on beach sand.

Maturo, Jr. et al. in U.S. Pat. No. 3,677,571, Hansen-Smith et al. in U.S. Pat. No. 4,838,608, Stenwall in U.S. Pat. No. 3,758,128, Mazzarelli et al. in U.S. Pat. No. 3,693,993 and Kuchinsky, Jr. in U.S. Pat. No. 4,659,142 all describe beach chairs having rolling cylinders. However, none of the cylinders and wheels of the prior art have holes through the cylinder wall to improve traction and none are coated with a sound deadening, electrically insulating, and resilient coating. None of the prior art disclose a curved tubular frame ergonomically designed to fit human body curves.

SUMMARY OF THE INVENTION

An object of the present invention is to address the foregoing drawbacks and deficiencies and provide an improved rolling beach chair that does not sink into loose sand and contaminate the hardware with sand.

Another object is to provide a beach lounge chair that can roll while supporting an adult human without damage to itself and without digging into the sand, and without noise when rolling over pavement.

Another object is to provide a beach lounge chair with rolling means that is lightweight, easy to transport, and that accommodates outdoor weather conditions at the beach without conducting electricity to ground.

Another object of the present invention is to provide a rolling beach lounge chair that will not easily roll away and blow away in the wind and waves.

Other objects and advantages will be more apparent from the following disclosure and appended claims.

DESCRIPTION OF PREFERRED EMBODIMENTS

Figure 1:
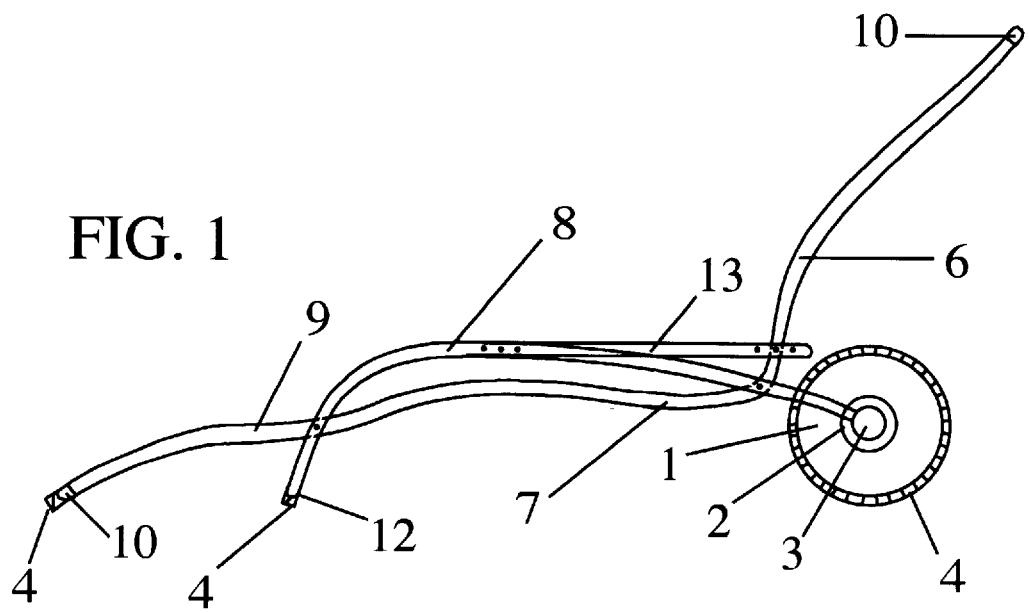
FIG. 1 is a side view of the rolling beach lounge chair.
Figure 2:
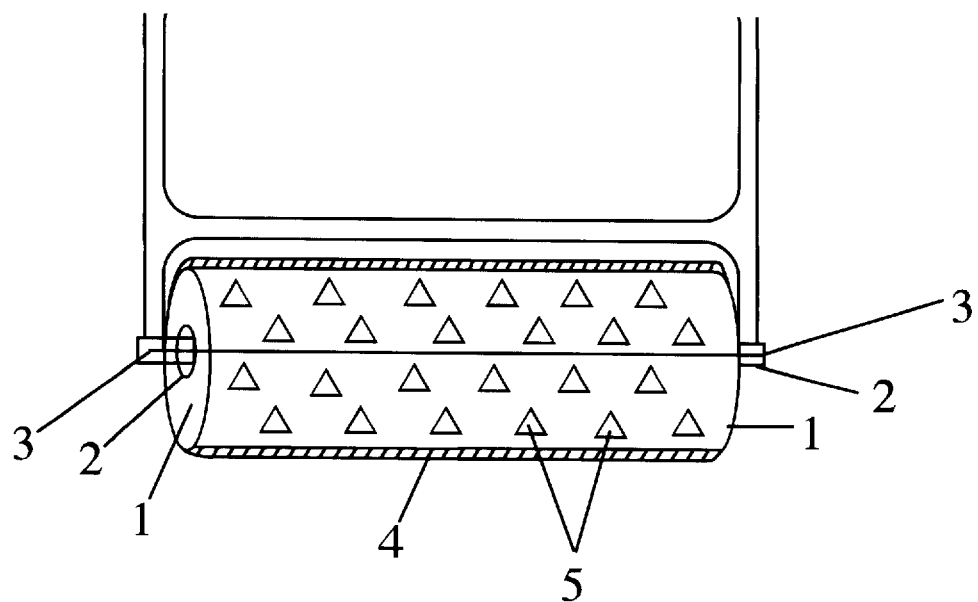
FIG. 2 is a rear cross-sectional view of the cylindrical roller of the chair of FIG. 1 of the first embodiment.

The present invention is a rolling beach chair having a roller adapted to roll over beach sand and coated with an insulating, resilient coating and having a tubular frame which is curved to fit the human body curves as shown in FIG. 1. A roller 1 is rotatively attached to the parallel tubular back legs with inert bushings 2 and circumferentially disposed about an axle 3 connecting the back legs of the chair. The cylindrical roller of the first embodiment is shown in FIG. 2. The bushings 2 are made of a material selected from nylon, Teflon®, polyvinylchloride, and plastic. The roller 1 is made of a lightweight material, preferrably aluminum, and coated with a resilient insulative coating 4, preferrably rubber.

The cylindrical roller is hollow and has holes 5 through both the circumferential surface of the hollow cylinder and the coating 4. The holes 5 are at most 10 cm in width, so that the roller 1 does not sink into beach sand. Both the tubular support frame and the cylindrical roller are open and hollow, so that water may enter and exit easily. In this way the chair remains fixed and does not float away when waves wash over the chair at the beach. The edges of the holes 5 provide traction in the sand to prevent sideways slipping. The resilient coating 4 is an electrical insulator, so that the chair will not act as an electrical ground during lightning, for example. The coating 4 also absorbs sound, so that it will be silent when rolled upon a hard surface, such as pavement and concrete. The tubular frame of the beach chair is ergonomically curved to comfortably fit human body curves. The frame includes a curved convex lumbar support 6, a curved concave gluteus support 7, arm rest supports 8, and a curved concave calf support 9, all built into the tubular frame of the lounge chair. This distributes weight and stress over a much greater percentage of the body surface area than the straight frames of the prior art. The tubular frame and roller 1 are made of a material selected from aluminum, tin, titanium, Kevlar®, polyvinylchloride, plastic, and wood. Adjustable backrest arms 13 are shown in FIG. 1. The front legs of the beach chair are connected to each other at the bottom by a tubular frame section 12 that is coated with the same electrically insulative, sound absorbing coating that is used to coat the roller 1. The top and bottom tubular frame members 10 are handles used to lift and roll the beach lounge chair on the roller 1 and are also coated with the roller coating described above.

Figure 3:
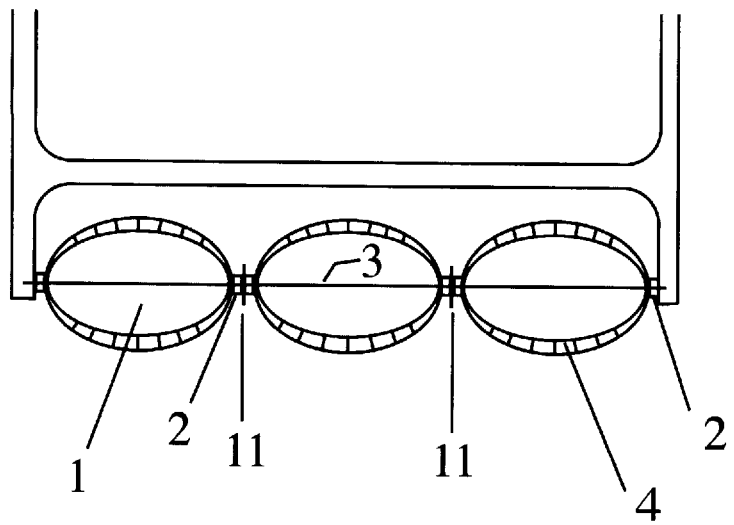
FIG. 3 is a rear cross-sectional view of the ellipsoidal rollers of the chair of FIG. 1 of the second embodiment.

A second embodiment of the roller 1 in the beach chair of FIG. 1 is shown in FIG. 3 wherein there are more than one ellipsoidal rollers separated from each other by bushings 2 and spacers I 1. This modification reduces the weight of the roller 1 and further improves sideways traction in beach sand. Each ellipsoidal roller rotates independently of the others to facilitate turning and rolling over uneven terrain.

Figure 4:
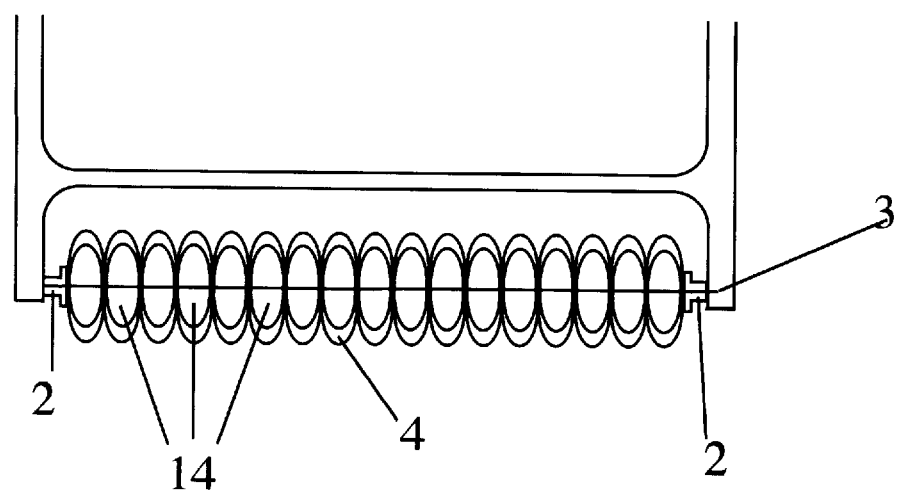
FIG. 4 is a rear cross-sectional view of the tubular roller of the beach chair of the third embodiment.

FIG. 4 shows a third embodiment of a roller of the beach chair shown in FIG. 1 in which the substantially cylindrical roller is made up of many small circular tubular sections 14. Each of these circular tubular sections is coated with a sound absorbing, electrically insulative coating 4. Lateral traction is provided by the grooves between the ciecular tubular sections 14 to prevent sideways slip when the chair is rolled over uneven loose sand and other surfaces.

Accordingly for all these reasons set forth, the present invention provides an improvement in the art of rolling beach chairs and has substantial commercial merit.

The present invention shall not be limited to the novel constructions and use as shown and described, but shall be limited only by the scope of the appended claims.

We claim:

1. A beach chair with cylindrical roller comprising a hollow tubular frame, said frame including a curved convex lumbar support, a curved concave gluteus support, an arm support, and a curved concave calf support, the curvature of each of said supports being built into said hollow tubular frame, said frame having two back legs, at least one hollow cylindrical roller being rotatively attached to said back legs and being circumferentially disposed about an axle connecting said back legs, the exterior surface of said roller being coated with an electrically insulative sound absorbing coating, said roller having holes in the circumferential surface of said roller penetrating both said roller and said coating.

2. The chair according to claim 1 wherein said holes are at most 10 cm in width, said roller is rotatively attached to said back legs by bushings, said bushings are constructed from a material selected from nylon, hydrocarbon polymer, polyvinylchloride, and plastic, said frame has two front legs which are connected to each other by a frame section, said frame section is coated with an electrically insulative sound absorbing coating, said frame and said roller are constructed of a material selected from aluminum, tin, titanium, hydrocarbon polymer, polyvinylchloride, plastic and wood.

* * * * *